(12) United States Patent
Bramauer

(10) Patent No.: US 12,140,941 B2
(45) Date of Patent: Nov. 12, 2024

(54) METHOD AND CONTROL UNIT FOR DETERMINING A CONDITION OF A SYSTEM

(71) Applicant: KNORR-BREMSE GESELLSCHAFT MIT BESCHRÄNKTER HAFTUNG, Mödling (AT)

(72) Inventor: Johann Bramauer, Ybbsitz (AT)

(73) Assignee: KNORR-BREMSE GESELLSCHAFT MIT BESCHRÄNKTER HAFTUNG (AT)

( * ) Notice: Subject to any disclaimer, the term of this patent is extended or adjusted under 35 U.S.C. 154(b) by 16 days.

(21) Appl. No.: 16/649,940

(22) PCT Filed: Sep. 20, 2018

(86) PCT No.: PCT/EP2018/075412
§ 371 (c)(1),
(2) Date: Mar. 23, 2020

(87) PCT Pub. No.: WO2019/057801
PCT Pub. Date: Mar. 28, 2019

(65) Prior Publication Data
US 2021/0382471 A1 Dec. 9, 2021

(30) Foreign Application Priority Data
Sep. 21, 2017 (DE) ..................... 10 2017 121 928.5

(51) Int. Cl.
*G05B 23/02* (2006.01)
(52) U.S. Cl.
CPC ..... *G05B 23/0283* (2013.01); *G05B 23/0213* (2013.01); *G05B 23/0256* (2013.01)

(58) Field of Classification Search
None
See application file for complete search history.

(56) References Cited

U.S. PATENT DOCUMENTS

| 4,525,782 A | 6/1985 | Wohlfarth et al. |
| 6,748,305 B1 | 6/2004 | Klausner et al. |

(Continued)

FOREIGN PATENT DOCUMENTS

| CN | 102798535 B | * | 9/2017 | ......... G05B 23/0283 |
| DE | 3110774 A1 | | 10/1982 | |

(Continued)

OTHER PUBLICATIONS

Translation of Ritter et al. (Year: 2017).*

(Continued)

*Primary Examiner* — Matthew G Marini
(74) *Attorney, Agent, or Firm* — Barnes & Thornburg LLP

(57) ABSTRACT

A method for determining a condition of a system is provided, wherein the system has at least one general functional component and at least one safety-critical functional component. The method includes generating a general prediction value and a safety prediction value for the system using at least one input signal that represents condition data relating to the functional components. The general prediction value represents a predicted condition of at least the at least one general functional component. The safety prediction value represents a predicted condition of the at least one safety-critical functional component.

8 Claims, 2 Drawing Sheets

(56) References Cited

U.S. PATENT DOCUMENTS

| | | | |
|---|---|---|---|
| 2008/0004829 A1* | 1/2008 | Gorin | G05B 23/0256 |
| | | | 702/108 |
| 2011/0202227 A1 | 8/2011 | Zhang et al. | |
| 2014/0365178 A1 | 12/2014 | Schramm et al. | |
| 2015/0121758 A1* | 5/2015 | Pohl | B60J 5/00 |
| | | | 49/506 |
| 2016/0215553 A1* | 7/2016 | Shibata | E05F 15/40 |

FOREIGN PATENT DOCUMENTS

| | | | | |
|---|---|---|---|---|
| DE | 10014994 A1 | | 10/2000 | |
| DE | 10222187 A1 | * | 12/2003 | ......... G05B 23/0283 |
| DE | 102010049909 A1 | | 5/2012 | |
| EP | 2774884 A1 | | 9/2014 | |

OTHER PUBLICATIONS

Translation of Thorsten et al. (Year: 2003).*
International Search Report and Written Opinion corresponding to PCT/EP2018/075412, dated Jan. 8, 2019.

* cited by examiner

METHOD AND CONTROL UNIT FOR DETERMINING A CONDITION OF A SYSTEM

CROSS REFERENCE AND PRIORITY CLAIM

This patent application is a U.S. National Phase of International Patent Application No. PCT/EP2018/075412 filed Sep. 20, 2018, which claims priority to German Patent Application No. 10 2017 121 928.5, the disclosure of which being incorporated herein by reference in their entireties.

FIELD

Disclosed embodiments relate to a method for determining a condition, for example of a vehicle, to a corresponding control unit and to a vehicle system for a vehicle.

BACKGROUND

A prediction of a condition of a system or of a component in the sense of condition-based maintenance (CBM) and/or predictive maintenance can be applied, for example, in the field of wind turbines.

SUMMARY

Against this background, the disclosed embodiments provide an improved method for determining a condition of a system, an improved control unit and an improved system. This is achieved using a method for determining a condition of a system, by a corresponding control unit, by a system and by a corresponding computer program.

BRIEF DESCRIPTION OF FIGURES

Exemplary embodiments of the approach presented here are explained in more detail in the following description with reference to the figures, in which.

DETAILED DESCRIPTION

Figure 1:
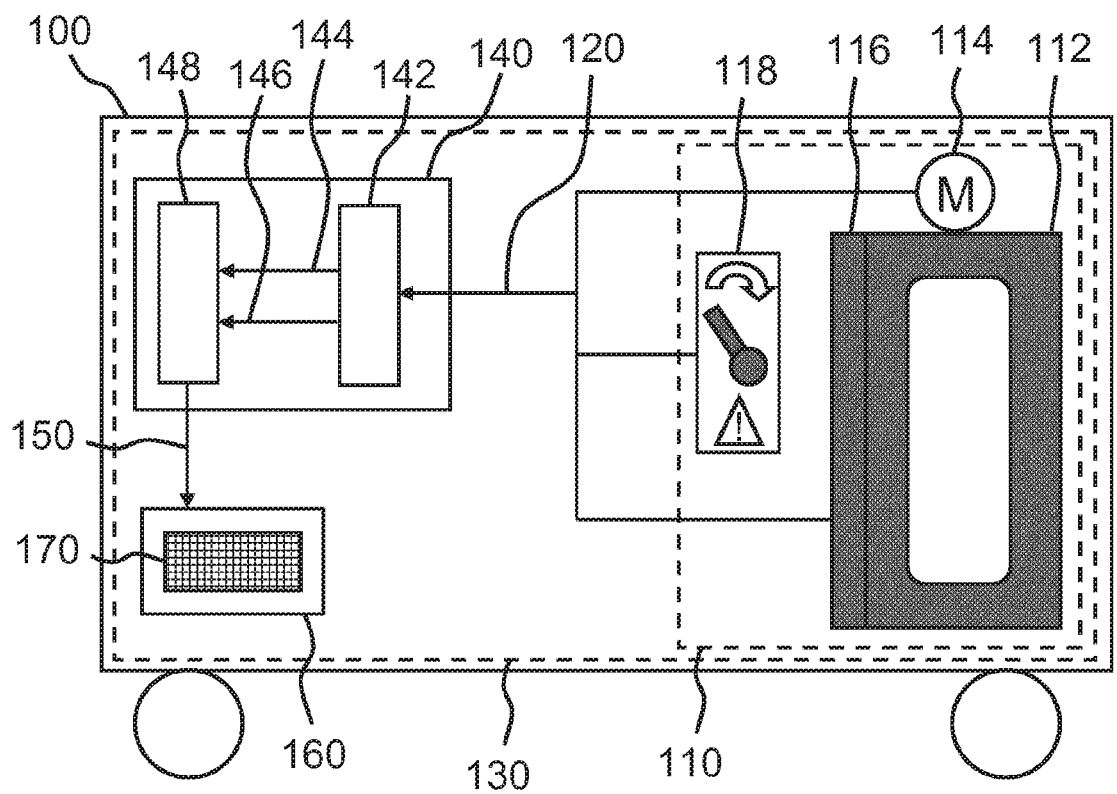
FIG. 1 shows a schematic illustration of a vehicle system according to an exemplary embodiment of a vehicle.

According to embodiments, future conditions of a system can be predicted, for example on the basis of process data and environmental data using a dedicated or separate indicator for a safety condition or for safety using algorithms. In this context, in particular a display of a safety condition of a system can be implemented by combining data from various sources and predicting unsafe conditions separate from operational faults. In addition to general condition indicators, for example a safety indicator can be generated for a system of a vehicle, in particular a door system, wherein the safety indicator is formed using algorithms and is related, in particular, to safety-critical processes or system components.

According to embodiments, in particular a safety condition of a system can advantageously be monitored. Therefore, for example preventative measures can be initiated in good time in order to maintain the safety of the system. In this context, in addition to general condition indicators, it is also possible to predict a safety indicator which has a specific reference to the safety of the system. Therefore, it is possible both to safely and reliably plan and execute maintenance of components of the system and to improve the operational safety of the system and therefore of the vehicle.

A method for determining a condition of a system, wherein the system has at least one general functional component and at least one safety-critical functional component, comprises generating a general prediction value and a safety prediction value for the system using at least one input signal, wherein the at least one input signal represents condition data relating to the functional components, wherein the general prediction value represents a predicted condition of at least the at least one general functional component, wherein the safety prediction value represents a predicted condition of the at least one safety-critical functional component.

The system can be a machine or a technical device, for example a vehicle or a wind turbine. The general functional component and the safety-critical functional component can be assigned to separate components or to one component. A corresponding component can be, for example, a motor to which both a general functional component and a safety-critical functional component can be assigned.

This method can be implemented, for example, in a control unit using, for example, software or hardware or using a mixed form of software and hardware. The vehicle may be, for example, a vehicle for passenger transportation. In particular, the vehicle can be embodied as a rail vehicle. The system can be a door system of the vehicle. A general functional component can be a drive device, a locking device or the like. A safety-critical functional component can be an anti-trapping device, an emergency unlocking device or the like. The generating operation can be carried out at least during part of an active operating time of the system in a continuous or cyclically repeated fashion.

According to one embodiment in the generating operation a safety prediction value is generated which represents a time frame for a maintenance operation on the at least one safety-critical functional component and additionally a residual running time up to a maintenance operation on the at least one safety-critical functional component. Such an embodiment provides the advantage that maintenance, in particular of the safety-critical functional component, can be carried out in a way which can be easily planned according to requirements and is safe.

In the generating operation, the safety prediction value can also be generated using usage data regarding a use, and additionally or alternatively regarding an activity of the at least one safety-critical functional component. Such an embodiment provides the advantage that an actual use of the at least one safety-critical functional component can be taken into account, in particular in respect of checking and maintenance.

In addition, in the generating operation the safety prediction value can be generated after a test run of the system has taken place. Such an embodiment provides the advantage that a reliable and informative safety prediction value can be generated.

In addition in the generating operation a general prediction value and a safety prediction value are generated which are suitable to be capable of being displayed graphically using a display device in separate bar displays regarding a due date for maintenance operations on the functional components and/or separate traffic light displays for the predicted conditions of the functional components. Such an embodiment provides the advantage that the prediction values can be processed in a visually simple fashion and can be displayed clearly and in an easily understood fashion. In addition, a display of the safety prediction value can be carried out in a way which is graphically separate from the general prediction value, in order to emphasize safety-critical processes.

The method can optionally also have a operation of providing the general prediction value and the safety prediction value for outputting to a display device and additionally or alternatively to another output device. In this context, the general prediction value and the safety prediction value are provided as at least an output signal. Such an embodiment provides the advantage that simple and rapid communication of the prediction values to receivers, users or the like can be achieved.

The method can also comprise a operation of reading in the at least one input signal from an interface to the functional components and additionally or alternatively to at least one detection device which is assigned to the functional components. Such an embodiment provides the advantage that condition data from different sources can be processed in order to generate the prediction values reliably and precisely.

The approach presented here also provides a control unit which is designed to carry out, actuate or implement the operations of a variant of a method presented here in corresponding devices. Using this embodiment variant in the form of a control unit it is also possible to achieve the object of the disclosed embodiments in a quick and efficient fashion.

For this purpose, the control unit can have at least one computing unit for processing signals or data, at least one memory unit for storing signals or data, at least one interface with a sensor or an actuator for reading in sensor signals from the sensor or for outputting control signals to the actuator and/or at least one communication interface for reading in or outputting data which are embedded in a communication protocol. The computing unit can be, for example, a signal processor, a microcontroller or the like, wherein the memory unit can be a flash memory, an EEPROM or a magnetic memory unit. The communication interface can be designed to read in or output data in a wireless fashion and/or line-bound fashion, wherein a communication interface which can read in or output line-bound data can read in this data, for example, electrically or optically from a corresponding data transmission line or can output the data into a corresponding data transmission line.

A control unit can be understood here to be an electrical device which processes sensor signals and outputs control signals and/or data signals as a function thereof. The control unit can have an interface which can be embodied using hardware and/or software. In the case of a hardware embodiment, the interfaces may be, for example, part of what is referred to as a system ASIC which contains a wide variety of functions of the control unit. However, it is also possible for the interfaces to be separate, integrated circuits or be at least partially composed of discrete components. In the case of a software embodiment, the interfaces may be software modules which are present, for example, on a microcontroller alongside other software modules.

A system, for example a vehicle system for a vehicle, has the following features: at least one general functional component; at least one safety-critical functional component; an embodiment of the control unit specified above; and a display device for displaying the general prediction value and the safety perdition value, wherein the display device can be or is connected with a signal transmission capability to the control unit.

The control unit can be capable of being connected or can be connected with a signal transmission capability to the at least one general functional component, to the at least one safety-critical functional component and additionally or alternatively to at least one detection device which is assigned to the functional components. The at least one general functional component and the at least one safety-critical functional component can be part of a system of the vehicle.

According to one embodiment, the control unit and additionally or alternatively the display device can be arranged in the vehicle. The control unit and additionally or alternatively the display device can also be capable of being connected or be connected with a signal transmission capability to the vehicle via an interface. Such an embodiment provides the advantage that the determination of the condition in respect of the system or of the functional components can be carried out in a vehicle-internal fashion or partially vehicle-external fashion, depending on the application case and the requirements.

In particular, the at least one safety-critical functional component can have a device for anti-trapping protection for a vehicle door, a device for emergency activation for a vehicle door and additionally or alternatively another device. Such an embodiment provides the advantage that critical functional components can be reliably monitored in respect of the safety of vehicle occupants.

A computer program product or computer program with program code which can be stored on a machine-readable carrier or storage medium such as a semiconductor memory, a hard disk memory or an optical memory and is used to carry out, implement and/or actuate the operations of the method according to one of the embodiments described above is also advantageous, in particular if the program product or program is executed on a computer or a device.

FIG. 1 shows a schematic illustration of a vehicle system 130 according to an exemplary embodiment of a vehicle 100. The vehicle 100 is, for example, a vehicle for passenger transportation, in particular a rail vehicle. The vehicle 100 has a system 110. According to the exemplary embodiment illustrated in FIG. 1, the system 110 has a vehicle door 112, for example only a general functional component 114 in the form of a door drive and only, for example, two safety-critical functional components 116 and 118 in the form of a device 116 for anti-trapping protection and a device 118 for emergency activation of a door.

The vehicle system 130 is representative here of any system whose condition can be determined using the approach described here.

According to the exemplary embodiment shown in FIG. 1, the vehicle system 130 has the general functional component 114, the safety-critical functional components 116, 118, a control unit 140 and a display device 160. The control unit 140 is designed to determine a condition of the system 110 of the vehicle 100. In this context, the control unit 140 is connected with a signal transmission capability to the general functional component 114 and the safety-critical functional components 116 and 118. In addition, the control unit 140 is connected with a signal transmission capability to the display device 160.

The control unit 140 is designed to read in at least one input signal 120 from an interface to the functional components 114, 116, 118 and/or to at least one detection device which is assigned to the functional components 114, 116, 118. The at least one input signal 120 represents condition data relating to the functional components 114, 116, 118. According to the exemplary embodiment illustrated in FIG. 1, the control unit 140 is designed to read in input signals 120 from the general functional component 114 and from the safety-critical functional components 116, 118.

The control unit 140 has a generating device 142. The generating device 142 is designed to generate a general prediction value 114 and a safety prediction value 146 for the system 110 using the at least one input signal 120. The general prediction value 144 represents a predicted condition of the at least one general functional component 114, i.e. of the door drive 114. The safety prediction value 146 represents a predicted condition of the safety-critical functional components 116 and 118, i.e. of the device 116 for anti-trapping protection and the device 118 for emergency activation of a door.

According to the exemplary embodiment illustrated in FIG. 1, in addition a provision device 148 is shown of the control unit 140. The provision device 148 is designed to provide the general prediction value 144 and the safety prediction value 146 or at least the safety prediction value 146 for outputting to the display device 160 and/or another output device. In this context, the provision device 148 is designed to provide the general prediction value 144 and/or the safety prediction value 146 in the form of an output signal 150.

The display device 160 is designed to display the general prediction value 144 and/or the safety prediction value 146 graphically in the form of a graphic illustration 170. In this context, the display device 160 is designed to display the general prediction value 144 and/or the safety prediction value 146 graphically using the output signal 150 from the control unit 140.

According to the exemplary embodiment shown in FIG. 1, the control unit 140 and the display device 160 are arranged in the vehicle 100. According to another exemplary embodiment, the control unit 140 and/or the display device 160 can be capable of being connected or can be connected with a signal transmission capability to the vehicle 100 via an interface, for example a radio interface. Furthermore, mixed forms thereof can be implemented. According to one exemplary embodiment, the input signal 120 is intermediately stored and/or conditioned by a device arranged in the vehicle 100, and is subsequently transmitted via a suitable interface to an external device, for example a server, for further processing.

According to one exemplary embodiment, the generating device 142 is designed to generate a safety prediction value 146 which represents a time frame for a maintenance operation on the safety-critical functional components 116, 118 and/or a residual running time up to a maintenance operation on the safety-critical functional components 116, 118. According to a further exemplary embodiment, the generating device 142 is designed to generate the safety prediction value 146 using usage data in respect of use and/or in respect of an activity of the safety-critical functional components 116, 118. The generating device 142 is optionally designed to generate the safety prediction value 146 after a test run of the system 110 has taken place.

Figure 2:
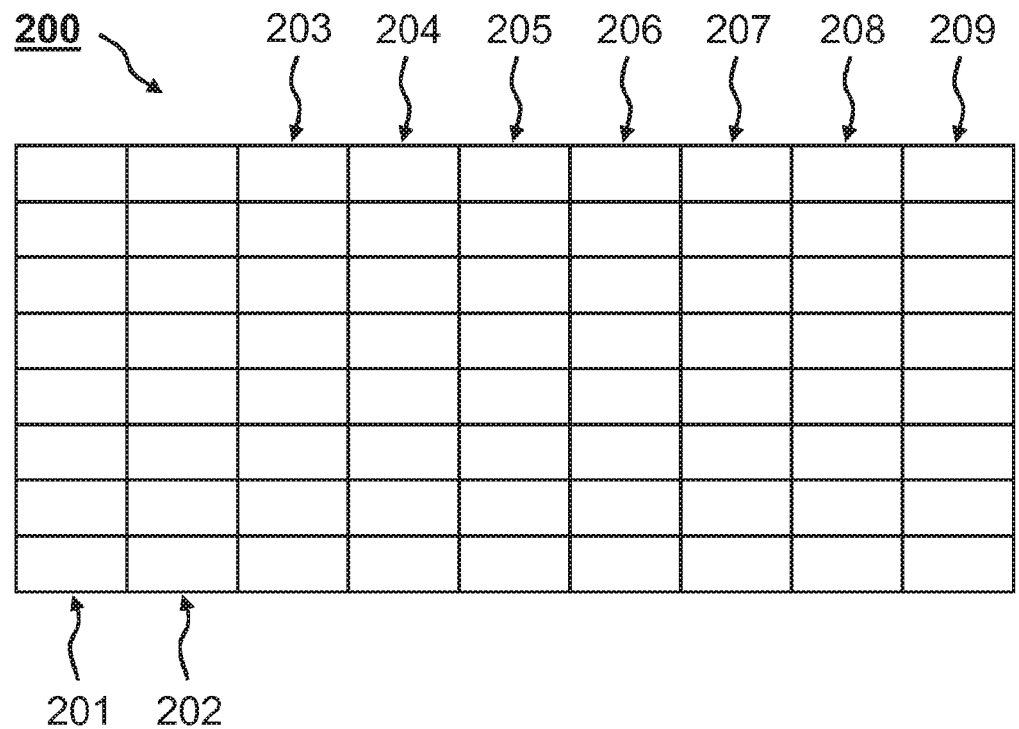
FIG. 2 shows a schematic drawing of a graphic illustration.

FIG. 2 shows a schematic drawing of a graphic illustration 200. The graphic illustration 170 is part of the graphic illustration of the display device from FIG. 1 or a similar graphic illustration. The graphic illustration 200 is embodied in the form of a table merely by way of example. In this context, the graphic illustration 200 has a multiplicity of display regions 201, 202, 203, 204, 205, 206, 207, 208, 209 in the form of columns.

The graphic illustration 200 has a display region 201 for a vehicle, a display region 202 for a vehicle part, a display region 203 for a system, a display region 204 for condition data, a display region 205 for a prediction, a display region 206 for a condition on the basis of the general prediction value, a display region 207 for a status on the basis of the general prediction value, a display region 208 for an online/offline condition and a display region 209 for a warning.

In the display region 206 for the condition on the basis of the general prediction value, for example a bar display regarding a due date for maintenance operations on the at least one general functional component is implemented. In the display region 207 for the status on the basis of the general prediction value, for example a traffic light display for the predicted conditions of the at least one general functional component is implemented.

The graphic illustration 200 represents an example of a graphic implementation of a conventional condition prediction with what is referred to as a life indicator for each system, a display of a residual running time and a traffic light for an overall condition or general condition.

Figure 3:
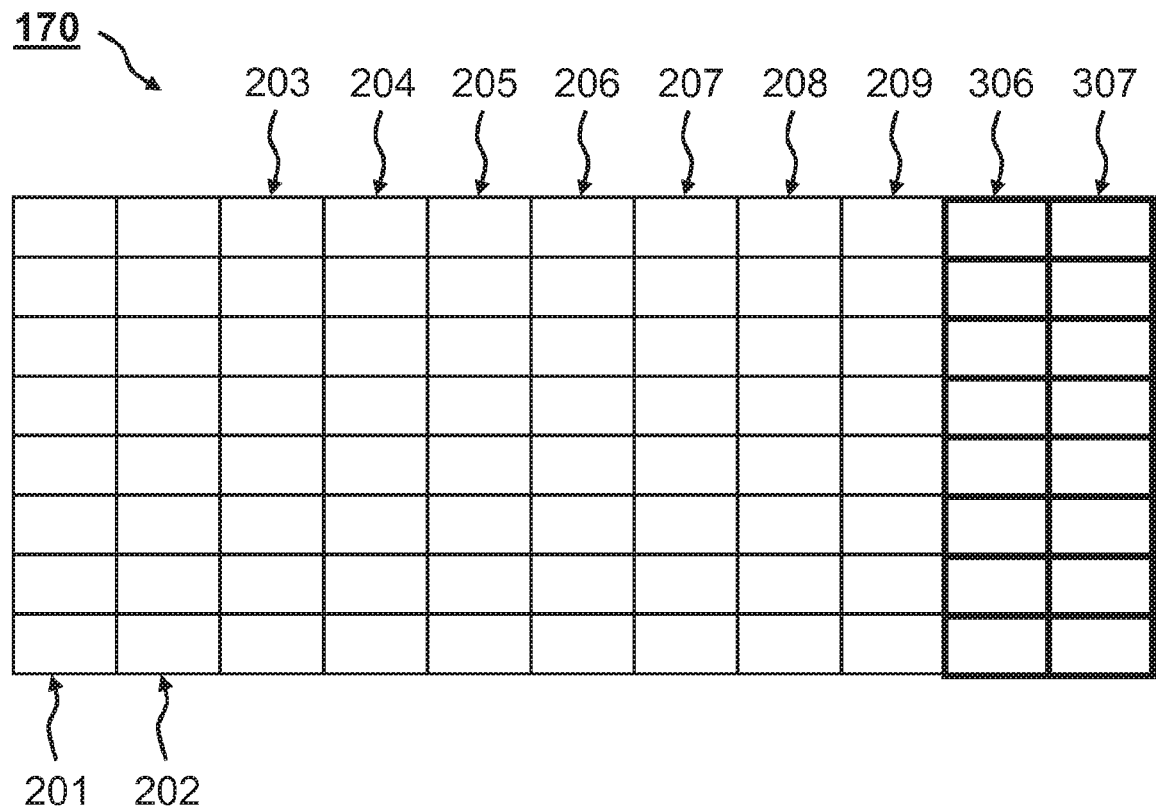
FIG. 3 shows a schematic drawing of a graphic illustration according to an exemplary embodiment.

FIG. 3 shows a schematic drawing of a graphic illustration 170 according to an exemplary embodiment. The graphic illustration 170 is the graphic illustration of the display device from FIG. 1. The graphic illustration 170 corresponds here to the graphic illustration from FIG. 1 with the exception that the graphic illustration 170 in FIG. 3 has two additional columns for a display region 306 for a condition on the basis of the safety prediction value and for a display region 307 for a status on the basis of the safety prediction value.

In the display region 306 for the condition on the basis of the safety prediction value, for example a bar display regarding a due date for maintenance operations on the at least one safety-critical functional component is implemented. In the display region 307 for the status on the basis of the safety prediction value, for example a traffic light display for the predicted conditions of the at least one safety-critical functional component is implemented.

In particular, the general prediction value and the safety prediction value are therefore suitable to be displayed graphically using the display device in the display region 206 for the condition on the basis of the general prediction value and in the display region 306 for the condition on the basis of the safety prediction value in separate bar displays and in the display region 207 for the status on the basis of the general prediction value, and in the display region 307 for the status on the basis of the safety prediction value in separate traffic light displays.

The graphic illustration 170 is therefore expanded relative to the graphic illustration from FIG. 2 with the display regions 306, 307 which are generated on the basis of the safety prediction value or safety indicator.

Figure 4:
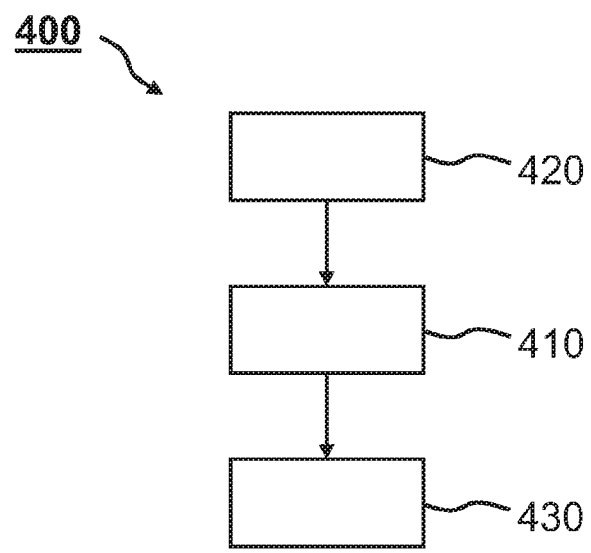
FIG. 4 shows a flow diagram of a determining method according to an exemplary embodiment.

FIG. 4 shows a flow diagram of a determining method 400 according to an exemplary embodiment. A condition of a system of a vehicle can be determined by executing the determining method 400. In particular, a condition of the system of the vehicle from FIG. 1 or of a similar system with at least one general functional component and at least one safety-critical functional component can be determined by executing the determining method 400. The determining method 400 can also be executed in conjunction with the control unit from FIG. 1 or a similar control unit.

In a generating operation 410, a general prediction value and a safety prediction value are generated for the system during the determining method 400 using at least one input signal. In this context, the at least one input signal represents condition data relating to the functional components. The general prediction value represents a predicted condition of at least the at least one general functional component. The safety prediction value represents a predicted condition of the at least one safety-critical functional component.

According to one exemplary embodiment, the determining method 400 also comprises a reading-in operation 420 and/or a provision operation 430. In the reading-in operation 420, the at least one input signal is read in from an interface to the functional components and/or to at least one detection device which is assigned to the functional components. In the provision operation 430, the general prediction value and the safety prediction value are provided for outputting to a display device and/or other output devices. In particular, in the provision operation 430 the general prediction value and the safety prediction value are provided to the display device from FIG. 1, in order to display the graphic illustration from FIG. 3 or a similar graphic illustration.

In other words, in the generating operation 410 it is possible to generate, in particular, the safety prediction value in particular taking into account the following influencing factors and/or objectives: detection of a time frame for safety checking and displaying of a residual running time up to the next necessary check; automatic reading-in or detection of safety-relevant functional components and/or functions and generating the safety prediction value and/or safety indicator on the basis of a use of these functional components such as, for example, anti-trapping protection, emergency activation etc.; automatically generating the safety prediction value after a test run has taken place; eliminating manual checking if the function was active within a defined time period.

LIST OF REFERENCE NUMBERS

100 Vehicle
110 System
112 Vehicle door
114 General functional component or door drive
116 Safety-critical functional component or device for anti-trapping protection
118 Safety-critical functional component or device for emergency activation
120 Input signal
130 Vehicle system
140 Control unit
142 Generating device
144 General prediction value
146 Safety prediction value
148 Provision device
150 Output signal
160 Display device
170 Graphic illustration
200 Graphic illustration
201 Display region for vehicle
202 Display region for vehicle part
203 Display region for system
204 Display region for condition data
205 Display region for prediction
206 Display region for condition on the basis of general predication value
207 Display region for status on the basis of general prediction value
208 Display region for online/offline
209 Display region for warning
306 Display region for condition on the basis of safety prediction value
307 Display region for status on the basis of safety prediction value
400 Determining method
410 Generating operation
420 Reading-in operation
430 Provision operation

The invention claimed is:

1. A method for determining a condition of a vehicle system, wherein the vehicle system has at least one general functional component and at least one safety-critical functional component, wherein the method comprises:
  generating a general prediction value and a safety prediction value for the vehicle system using at least one input signal via a control unit and detection of a time frame for safety checking and displaying of a residual running time up to the next necessary check, and
  displaying the general prediction value and the safety prediction value graphically using a display device, coupled to the control unit to receive the generated prediction value and safety prediction value, in separate bar displays regarding a due date for maintenance operations on the functional components and separate traffic light displays for the predicted conditions of the functional components,
  wherein the at least one input signal represents condition data relating to use and activity of the functional components,
  wherein the general prediction value represents a predicted condition of at least the at least one general functional component,
  wherein the safety prediction value represents a predicted condition of the at least one safety-critical functional component,
  wherein, during the generating, the safety prediction value is generated which represents a time frame for a maintenance operation on the at least one safety-critical functional component and a residual running time up to a maintenance operation on the at least one safety-critical functional component, and is determined, at least in part by the activation at least one safety-critical functional component during the determined time frame for safety checking,
  wherein the generating is carried out during part of an active operating time in the system in a continuous or cyclically repeated manner,
  in response to a determination that the at least one safety-critical functional component was active during the determined time frame for safety checking, eliminating a manual check requirement for the functional components and maintaining the manual check requirement in response to a determination that that the at least one safety-critical functional component was inactive during the determined time frame for safety checking, and
  wherein, during the generating, the safety prediction value is generated after a test run of the system has taken place.

2. The method of claim 1, wherein, in the generating operation, the safety prediction value is generated using usage data regarding a use and/or regarding an activity of the at least one safety-critical functional component.

3. The method of claim 1, further comprising providing the general prediction value and the safety prediction value for outputting to a display device and/or other output device.

4. The method of claim 1, further comprising reading in the at least one input signal from an interface to the functional components and/or to at least one detection device which is assigned to the functional components.

5. A control unit which is configured to carry out and/or actuate operations of a method for determining a condition of a system that has at least one general functional component and at least one safety-critical functional component in corresponding units, wherein the method comprises:
  generating a general prediction value and a safety prediction value for the system using at least one input signal from an interface with the at least one general functional component and the at least one safety-critical functional component and detection of a time frame for safety checking and displaying of a residual running time up to the next necessary check, and
  outputting the general prediction value and the safety prediction value to a display device coupled to the control device,
  wherein the at least one input signal represents condition data relating to the functional components,
  wherein the general prediction value represents a predicted condition of at least the at least one general functional component, and
  wherein the safety prediction value represents a is generated which represents a time until maintenance of the at least one safety-critical functional component and is determined, at least in part by a determination that the at least one safety-critical functional component was active during a determined time frame for safety checking, and
  wherein the generating is carried out by the control unit during part of an active operating time in the system in a continuous or cyclically repeated manner, and
  in response to a determination that the least one safety-critical functional component was active during the determined time frame for checking, eliminating a manual check requirement and maintaining the manual check requirement in response to a determination that that the at least one safety-critical functional component was inactive during the determined time frame for safety checking.

6. A system for a vehicle, wherein the system comprises:
  at least one general functional component comprising a door drive;
  at least one safety-critical functional component, the at least one safety-critical functional component is an anti-trapping protection device for a vehicle door, and a device for vehicle door emergency activation device;
  a control unit configured to carry out and/or actuate operations of a method for determining a condition of the system that has the at least one general functional component and the at least one safety-critical functional component and generate a general prediction value and a safety prediction value based on the determined condition of the system and detection of a time frame for safety checking and displaying of a residual running time up to the next necessary check; and
  a display device for displaying the general prediction value and the safety prediction value, wherein the display device is connected with a signal transmission capability to the control unit,
  wherein the safety prediction value is generated which represents a time frame for a maintenance operation on the at least one safety-critical functional component and a residual running time up to a maintenance operation on the at least one safety-critical functional component, and is determined, at least in part by the determination that the at least one safety-critical functional component was active during the determined time frame for safety checking,
  wherein the determining is carried out by the control unit during part of an active operating time in the system in a continuous or cyclically repeated manner, and
  in response to a determination that the at least one safety-critical functional component was active during the determined time frame for safety checking, eliminating a manual check requirementof the functional components and maintaining the manual check requirement in response to a determination that that the at least one safety-critical functional component was inactive during the determined time frame for safety checking.

7. The system of claim 6, wherein the control unit and/or the display device is or are arranged in a vehicle, wherein the control unit and/or the display device can be connected or is or are connected with a signal transmission capability to the vehicle via an interface.

8. A non-transitory machine-readable storage medium on which a computer program including computer program code is stored, wherein the computer program code, when executed on a processor, causes the processor to perform a method of determining a condition of a system that has at least one general functional component and at least one safety-critical functional component, wherein the method comprises:
  generating a general prediction value and a safety prediction value for the system based on at least one input signal from an interface with the at least one general functional component and the at least one safety-critical functional component and detection of a time frame for safety checking and displaying of a residual running time up to the next necessary check, and
  outputting the general prediction value and the safety prediction value to a display device coupled to the control device,
  wherein the at least one input signal represents condition data relating to the functional components,
  wherein the general prediction value represents a predicted condition of at least the at least one general functional component,
  wherein the safety prediction value represents a predicted condition of the at least one safety-critical functional component,
  wherein, during the generating, the safety prediction value is generated which represents a time frame for a maintenance operation on the at least one safety-critical functional component anda residual running time up to a maintenance operation on the at least one safety-critical functional component, and is determined, at least in part by the determination that the at least one safety-critical functional component was active during the determined time frame for safety checking,
  wherein the generating is carried out during part of an active operating time in the system in a continuous or cyclically repeated manner, and
  in response to a determination that the at least one safety-critical functional component was active during the determined time frame for safety checking, eliminating a manual check requirement of the functional components and maintaining the manual check requirement in response to a determination that that the at least one safety-critical functional component was inactive during the determined time frame for safety checking.

* * * * *